US005798465A

United States Patent [19]

Ziada et al.

[11] Patent Number: 5,798,465

[45] Date of Patent: Aug. 25, 1998

[54] METHOD FOR ACTIVELY DAMPING GLOBAL FLOW OSCILLATIONS IN SEPARATED UNSTABLE FLOWS AND AN APPARATUS FOR PERFORMING THE METHOD

[75] Inventors: Samir Ziada, Neftenbach; Hans Rudolf Graf, Winterthur, both of Switzerland

[73] Assignee: Sulzer Innotec AG, Winterthur, Switzerland

[21] Appl. No.: 608,397

[22] Filed: Feb. 28, 1996

[30] Foreign Application Priority Data

Mar. 14, 1995 [EP] European Pat. Off. .............. 95810167

[51] Int. Cl.[6] ............................ B64C 21/00; B64C 23/00

[52] U.S. Cl. ....................... 73/861.21; 244/203; 244/204; 244/207; 244/208; 244/209; 701/116

[58] Field of Search ........................ 73/198, 570, 861.04, 73/861.18, 861.21, 861.356, 861.357, 861.22–861.24; 244/130, 198, 199, 200, 203, 204, 207, 208, 209; 137/13, 828–831, 842; 701/116

[56] References Cited

U.S. PATENT DOCUMENTS

| | | | |
|---|---|---|---|
| 3,362,663 | 1/1968 | Wehrmann | 244/130 |
| 3,774,867 | 11/1973 | Quinn | 244/203 |
| 4,257,224 | 3/1981 | Wygnanski et al. | 60/204 |
| 4,516,747 | 5/1985 | Lurz | 244/204 |
| 4,664,345 | 5/1987 | Lurz | 244/209 |
| 4,706,902 | 11/1987 | Destuynder et al. | 244/76 C |
| 4,802,642 | 2/1989 | Mangiarotty | 244/200 |
| 4,813,631 | 3/1989 | Gratzer | 244/35 R |
| 4,932,610 | 6/1990 | Maestrello | 244/203 |
| 4,989,810 | 2/1991 | Meier et al. | 244/208 |
| 5,040,560 | 8/1991 | Glezer et al. | 137/13 |
| 5,209,438 | 5/1993 | Wygnanski | 244/203 |

FOREIGN PATENT DOCUMENTS

| | | |
|---|---|---|
| 3228939C1 | 11/1983 | Germany . |
| 1107202 | 3/1968 | United Kingdom . |
| 2139734 | 11/1984 | United Kingdom . |

OTHER PUBLICATIONS

Huang, X.Y., et al., "On the Active Control of Shear Layer Oscillations Across a Cavity in the Presence of Pipeline Acoustic Resonance", *Journal of Fluids and Structures*, 5:207–219.

*Primary Examiner*—Hezron E. Williams
*Assistant Examiner*—Rose M. Miller
*Attorney, Agent, or Firm*—Townsend and Townsend and Crew LLP

[57] ABSTRACT

The method for damping global flow oscillations (20a.x, 20b.x) in a flowing medium in the region of an unstable flow (10) separating itself from at least one boundary surface (11, 12) is comprised of detecting the global flow oscillations with a sensor system (13) and superimposing a compensatory oscillation (15, 16) controlled by the signals of the sensor system onto the flowing medium in a separation zone of the separated unstable flow. Correspondingly, the apparatus for performing the method comprises a generator (17, 18) which superimposes a compensatory oscillation on the flowing medium in a separation zone of the separated unstable flow and a control system (28, 29) which evaluates the signals of the sensor system and controls the compensatory oscillation so that the amplitude of the global flow oscillation is damped by a prespecified factor.

19 Claims, 9 Drawing Sheets

FIG. 1A
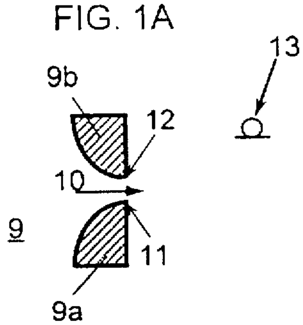
FIG. 1C
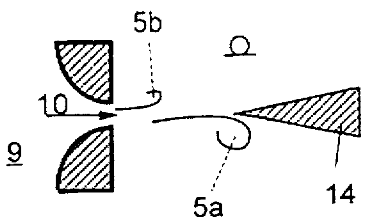
FIG. 1B
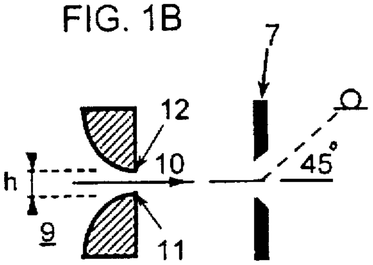
FIG. 1D
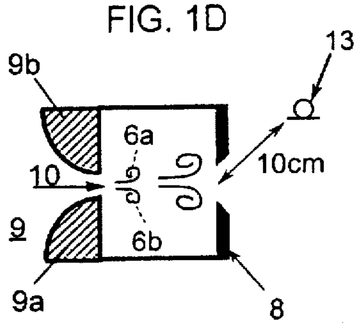
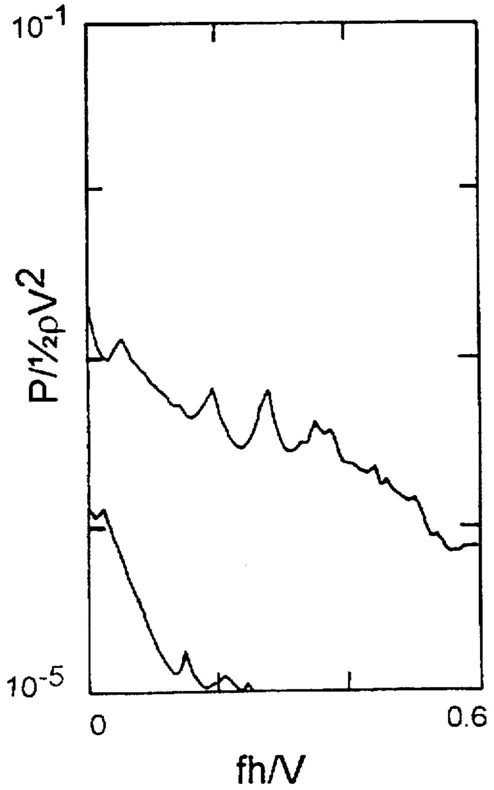
FIG. 1E
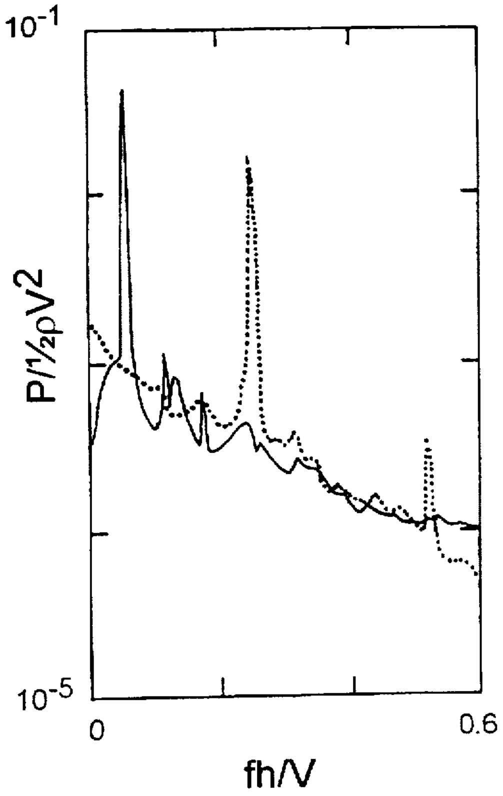
FIG. 1F

METHOD FOR ACTIVELY DAMPING GLOBAL FLOW OSCILLATIONS IN SEPARATED UNSTABLE FLOWS AND AN APPARATUS FOR PERFORMING THE METHOD

BACKGROUND OF THE INVENTION

1. Field of the Invention

The invention relates to a method for actively damping global flow oscillations in a flowing medium in the region of an unstable flow separating away from at least one boundary surface and to an apparatus for performing the method.

2. Description of the Prior Art

Global flow oscillations are self-excited vortex-like disturbances which arise periodically in separated unstable flows and then propagate downstream. A separated flow refers to a flow which has separated itself from at least one of the boundary surfaces to which it is adjacent, i.e. depending on the form of the boundary surfaces the flow lines no longer follow the boundary surface after a so-called separation point and no longer extend parallel to the boundary surface. A tendency for unstable behavior is often associated with flow separation, i.e. after its separation the flow has at least one unstable layer following a flow line, this layer being characterized in that a small deviation of the layer continuously increases downstream by drawing energy from the flow until non-linear processes limit this growth. As a consequence of the non-linearities, a disturbance finally goes over into a vortex. According to this scenario, flow oscillations of the initially named kind form in the proximity of a separation point from small disturbances of an unstable layer. A known adequate condition for an unstable layer is for example a turning point in the speed profile of the flow along a line orthogonal to the flow lines. An unstable layer of this kind is termed a shear layer. Flows having a plurality of separation points may have a plurality of unstable layers, each acting as a source for vortices, which collectively cooperate to form a joint "global" flow oscillation structure.

A characteristic feature of these flow oscillations is that the vortices arise periodically as a result of a self-exciting mechanism and represent a source of acoustic waves having a frequency corresponding to the rate of generation of the vortices. Due to the broadcasting acoustic radiation, these global flow oscillations are undesired in technical flow systems, not only because they usually occur in low frequency regions of less than 10 kHz and are thus disturbing as noise pollution, but rather because in special configurations they can become so intense that they can for example lead to material fatigue in the bodies exposed to the sound. Material fatigue of this kind can have very serious consequences in flow systems if not avoided by the design or rectified in time by routine inspection and repair. Steam and cooling water lines in power stations or gas circulating aeronautical bodies such as airplanes are only two examples where global flow oscillations can occur and possibly lead to dangerous situations if material fatigue occurs.

It is not always possible to design a flow system in which global flow oscillations are avoided even if account is taken of all that is known about the causes of the occurrence of global flow oscillations. For such cases, there is an interest in active control methods which allow the flow oscillations present to be damped in an intelligent manner with the aid of suitable compensatory feed-back.

A method for actively damping global flow oscillations with the aid of feed-back is already known. The article "On the active control of shear layer oscillations across a cavity in the presence of pipeline acoustic resonance" by X. Y. Huang et al., Journal of Fluids and Structures 5, 207–219 (1991), describes a method for actively damping global flow oscillations in a flow system for air in which a part of the walls enclosing the flowing air is formed as an acoustic resonator for the acoustic wave generated as a result of global flow oscillations in the resonator. In the method described for actively damping global flow oscillations, a compensatory feed-back is provided in which the acoustic wave in the resonator is compensated with the sound from a loudspeaker the radiation from which is coupled into the resonator, wherein the loudspeaker is driven with the suitably frequency-filtered, amplified and phase-shifted signals of a sensor which measures the global flow oscillations. The global flow oscillations are thus damped indirectly via the compensation effect of the acoustic wave.

This method is tailored to a specific situation, namely to the situation where an acoustic resonator is present which has a frequency matched to the acoustic waves radiated out from the global flow oscillations and which, as a result of the interaction between the separated unstable flow and the acoustic wave, provides the self-excitation of specific global flow oscillations. This way of proceeding is therefore fundamentally not applicable to cases in which global flow oscillations are excited by completely different self-excitation mechanisms. For example, it is known that an obstacle introduced into a separated unstable flow can cause global flow oscillations to arise, wherein specific details of the vortices produced, such as the frequency of the broadcast acoustic wave or the diametric arrangement of vortices produced temporarily one after another are interdependent via details such as the shape of the obstacle and the flow speed and the viscosity of the flowing medium. In this example, an acoustic resonance does not induce flow oscillations. Rather, fluctuations in unstable layers after the interaction with the obstacle act backwards upstream onto the unstable layers in the proximity of the separation points. This reverse effect leads to self-excitation of global flow oscillations, i.e. similar vortices are produced again and again periodically as a result of the permanent feed-back caused by this reverse effect.

SUMMARY OF THE INVENTION

It is therefore the object of the present invention to provide a method for actively damping global flow oscillations which

- functions universally, i.e. independently of the specific excitation mechanism responsible for the flow oscillations, and
- is as efficient as possible, i.e. requires as little power as possible for the damping, and to provide an apparatus for performing the method.

The idea on which the invention is based relates to the observation that, in general, the global, oscillations are disturbances of a separated unstable flow which reproduce themselves periodically and which, as a result of some cause which is not more nearly specified, are produced in the direct proximity of the separation point and that it is the property of an unstable flow to amplify these disturbances as measured by their extent and the energy stored in them until non-linear processes hinder further amplification.

The method of the invention for damping global flow oscillations in a flowing medium in the region of an unstable flow separating itself from at least one boundary surface is comprised of detecting the global flow oscillations with a sensor system and superimposing a compensatory oscillation controlled by the signals of the sensor system onto the flowing medium in a separation zone of the separated unstable flow. Correspondingly, the apparatus of the invention for performing the method comprises a generator which superimposes a compensatory oscillation on the flowing medium in a separation zone of the separated unstable flow and a control system which evaluates the signals of the sensor system and controls the compensatory oscillation so that the amplitude of the global flow oscillation is damped by a prespecified factor.

The term separation zone is used here to refer to a region of the unstable flow which starts at a separation point and extends downstream, wherein, in this region, a disturbance of the flow increases downstream. The compensatory oscillation ideally directly influences the separated unstable flow such that it exactly compensates a small disturbance present in a prespecified part of the separation zone which would otherwise enlarge itself as a result of the amplification action of the unstable flow and then develop into a vortex. Physically, an exact compensation of the disturbance before its amplification prevents the development of an extended vortex since the cause is taken away from the effect. The term compensatory oscillation is used in the following to generally refer to the direct influence of the separated unstable flow of the kind that reduces the amplitude of a small disturbance present in a prespecified part of the separation zone, which would otherwise increase as a result of the amplification action of the unstable flow and develop into a vortex. The global flow oscillation is then generally not perfectly suppressed by the compensatory oscillation but rather has its intensity damped as measured by the amount of energy taken up by the disturbance or the intensity of the acoustic wave emitted from the flow oscillation.

Consequently, the method of the invention is comprised of determining what disturbance would result in the observed flow oscillation with the aid of a measurement of the global flow oscillation present by means of a sensor system in an approximate manner for a specified region of the separation zone and then superposing this disturbance in anti-phase onto the flow in the specified region of the separation zone and optionally with reduced amplitude, i.e. with a compensatory action for the disturbances present. Since the global flow oscillations represent a periodic process, the measurement of a flow oscillation for a given point in time allows a compensatory disturbance to be determined which is superimposed onto the flow in a prespecified region of separation zone with the correct phase which can then damp the first, the subsequent, or one of the following vortex formations.

Since these considerations of the mode of functioning of the method of the invention do not depend on a particular self-excitation mechanism, this method can be universally applied for damping flow oscillations. The efficiency of this method is high because the energy which needs to be applied to damp a flow oscillation only corresponds to that required to produce the compensatory disturbance in a part of the separation zone. This amount of energy is however small in relation to the amount of energy represented by the undamped flow oscillation since the flow oscillation draws energy from the disturbance as a result of the amplification mechanism described. The high efficiency of the method of the invention results from the fact that it influences an unstable flow at its most sensitive region, i.e. where the flow becomes unstable as viewed downstream and where the amplification mechanism begins to act.

BRIEF DESCRIPTION OF THE DRAWINGS

FIG. 1A is a configuration for separated unstable flow without global flow oscillations;

FIG. 1B is a configuration for separated unstable flow with weak global flow oscillation;

FIG. 1C is a configuration for separated unstable flow with strong anti-symmetric global flow oscillation;

FIG. 1D is a configuration for separated unstable flow with a strong symmetric global flow oscillation;

FIGS. 1E–F illustrate frequency spectra of the signals of a sensor for determining the flow oscillations of the configurations in FIGS. 1A to D;

DETAILED DESCRIPTION OF THE PREFERRED EXEMPLARY EMBODIMENTS

Figure 2:
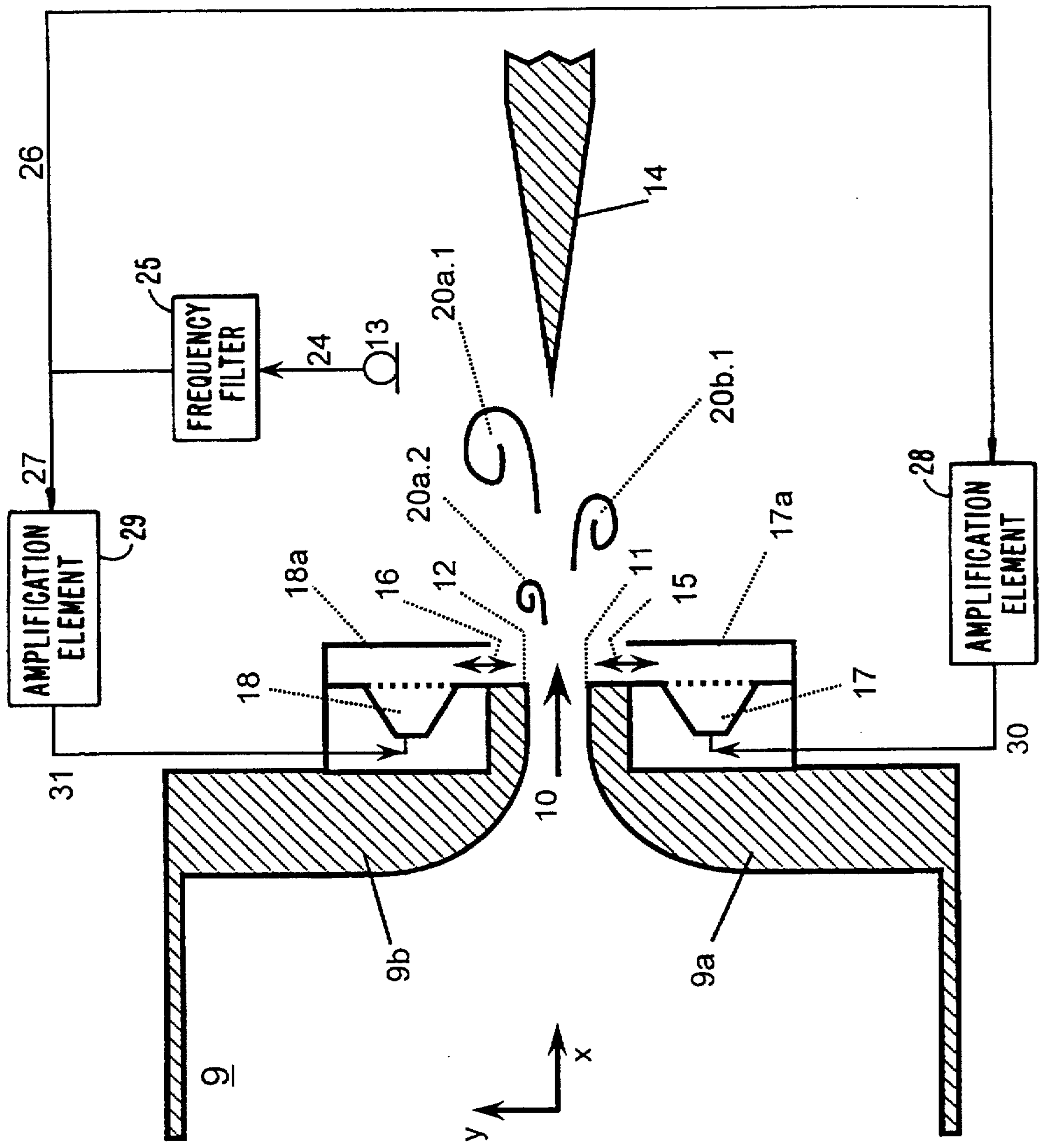
FIG. 2 is an arrangement for actively damping global flow oscillations by means of feed-back using transverse flow as the compensatory oscillation.

FIG. 1 shows examples for flow systems which can result in various global flow oscillations and, for each flow system, the associated frequency spectrum of the signal P of a pressure sensor 13. The pressure sensor 13 is provided for determining global flow oscillations without substantially effecting the flow by its presence at a point in the region of a separated unstable flow. These examples serve as a starting point for a description of the mode of operation of the method of the invention and for describing embodiments of apparatuses for its application.

FIGS. 1A to D show four flow systems which each have a similar source for a separated unstable flow 10 as well as a similar slot 9 of width h which traverses a flow medium of any kind such as a liquid, a gas or a gas liquid mixture having density ρ and flow speed V. The flow systems are each shown in cross section perpendicular to the slot 9 i.e. the slot 9, is defined by the two bounding elements 9*a*, 9*b* extending perpendicular to the plane of the paper. Furthermore, it is assumed that the slot width h is very small in relation to the length of the slot and that the cross sections illustrated are situated in the center region of the slot where the flow conditions in the vertical direction can be assumed to be invariant. In the two-dimensional view shown in FIGS. 1A to D, the flow separates off from the two confining boundary surfaces of the slot 9 at two separation points 11 and 12. After the separation, the flow dynamics are free from further direction influencing boundary surfaces, assuming that no obstacle is placed in the way (FIG. 1A), and are only limited in their propagation by their internal friction described with the dynamic viscosity ν. It is assumed that no self-exciting mechanisms for global oscillations are realized in this free propagation (e.g. an acoustic resonance). The frequency spectrum of the pressure sensor 13 then displays only a weak, broad-band fluctuation around the frequency f=0 (curve a in FIG. 1E). A condition for the self-excitation of flow oscillations is given when, after separation has taken place, an obstacle is placed downstream and influences the further course of flow such as in the arrangements of FIGS. 1B to D. In these cases, an elevation of the level of the broad-band fluctuation around the frequency f=0 and the occurrence of narrow-band maxima of higher frequencies are characteristic. The narrow-band maxima represent pressure pulsations. The amplitudes of these maxima are a measurement of the intensities of the global flow oscillations. Clearly, the frequencies f and the intensity of the flow oscillations depend not only on the flow speed V but also on the geometrical arrangement of the obstacle in relation to the slot 9 (FIG. 1B: slit 7; FIG. 1C: wedge 14; FIG. 1D: slit 8 with side walls). A further property of the flow oscillations which is relevant for performing the method of the invention, but which cannot be derived from the frequency spectra of a pressure sensor, is the spacial distribution of the vortices which are produced one after another as viewed at a particular point in time. At a particular point in time, the vortices generated under different conditions can have different spatial forms. The flow system shown in FIG. 1 can have, for example, two separation points wherein each of these separation points forms an edge point for an unstable layer extending downstream. The vortices generated separately in the two unstable layers, but which contribute to a common flow oscillation, can differ other than in their sense of rotation as a result of the time difference between the production of a vortex in the one unstable layer and the production of the next vortex in the other unstable layer. This time difference results in a different separation of the two vortices from the separation points 11 and 12 at the slot 9. Vortices can be produced in the two layers more or less simultaneously (symmetric modes, e.g. vortices 6*a*, 6*b* in FIG. 1D) or in anti-phase, i.e. alternately in the same time separation either at the separation point 11 or at the separation point 12 (anti-symmetric modes, e.g. vortices 5*a*, 5*b* in FIG. 1C), wherein usually it is the perfectly symmetric or the perfectly anti-symmetric flow oscillations which have the largest intensity. The temporal evolution of these vortices needs to be taken account of in order to synthesize a compensatory oscillation of correct phase for the damping of the global flow oscillation.

Taking account of the named basic properties of the global flow oscillations, the method of the invention for damping flow oscillations and the preferred apparatuses for its application are now explained with the aid of one of the flow systems detailed in FIG. 1. As an example, the system shown in FIG. 1C is used in which a slit 9 is the origin of a separated unstable flow and in which a wedge 14 is the obstacle. This special selection does not in any way limit the generality of the invention since the method it functions independently of the mechanisms leading to the excitation of the specific flow oscillations.

The method of the invention is comprised of the following three method steps:

- measurement of the global flow oscillations with a sensor system;
- production of a compensatory oscillation in a separation zone;
- processing of the sensor signals and control of the compensatory oscillation.

An arrangement for implementing the method is shown in FIG. 2.

I. Measurement of the global flow oscillations with a sensor system

In FIG. 2, the obstacle which causes the flow oscillation, namely the wedge 14, is positioned symmetrically relative to a central line, defined by the slit 9, that is perpendicular to the x axis. In this example, the global oscillation is characterized by vortices 20*a*.1, 20*a*.2 . . . and vortices 20*b*.x (x=1, 2, . . . ) which are each produced offset in time by one-half period of the flow oscillation either at the separation point 11 (y<0) or at the separation point 12 (y>0) of the separated unstable flow and then propagate in the x direction with mutually opposing senses of rotation. This is an example of an anti-symmetric flow oscillation. The important parameters measured with regard to the active damping of the flow oscillation are the frequency and a parameter for the intensity of the oscillation. Furthermore, it is useful to obtain data relating to the phase position of the different vortex trains 20*a*.x and 20*b*.x (x=1, 2 . . . ). This last mentioned phase information is however not absolutely necessary for performing the method.

The sensors used for measuring the frequency and intensity of the flow oscillation are in preferred forms a pressure sensor or a sensor for measuring the flow speed. Preferred positions for such sensors are points in the flowing medium at which on the one hand the sensor does not influence the flow strongly and does not itself act to induce flow oscillations. On the other hand, points located in the region of influence of the vortices with the largest extension or points in the proximity of the obstacle which causes the flow oscillation are advantageous for optimizing the sensor sensitivity. The sensor can also be installed in the obstacle.

An alternative sensor for measuring the frequency and the intensity of the flow oscillation is a force sensor which detects the force which the flow exerts on the obstacle 14.

Suitable sensors are commercially available. For example, a microphone is suitable for use as a pressure sensor, a hot-wire instrument as the sensor for measuring the flow speed, and wire strain gauges or piezoelectric or piezoresistive sensors as the force sensors.

II. Production of a compensatory oscillation

FIG. 2 shows a possible design for a generator for a compensatory oscillation in a separation zone, i.e. a compensatory flow field in the region of the separation zone. The compensatory flow field corresponds to an acoustic wave and influences the separated unstable flow 10 directly after the separation of the flow. Ideally, it is so designed that disturbances of unstable layers are exactly compensated by the pressure gradients associated with the compensatory flow field. In the arrangements in FIG. 2, a compensatory flow field is approximately assembled with the aid of two excitation sources 17, 18 which each produce a transverse flow 15, 16 transverse to the separated flow 10 and along to boundary surfaces 17*a* and 18*a*, wherein the transverse flows are controllable independently of one another as regards their flow speeds. The transverse flows are indicated in FIG. 2 with the double-headed arrows alongside the separation points 11 and 12. The outlet apertures for the transverse flows are placed such that an outlet aperture is positioned as close as possible to each separation point 11 and 12 without the outlet aperture itself substantially affecting the flow. As a result of the proximity of the outlet apertures to the separation points, the amount of power which needs to be applied in order to produce the compensatory oscillation is particularly small. The independent controllability of the two excitation sources allows a flow field to be superimposed which can be controlled along two lines in relation to amplitude and phase. The x position of the boundary surfaces 17*a* and 18*a* determines the width of the compensatory flow field. In accordance with the invention, it is sufficient to limit the extent of the compensatory flow field to the separation zone of the separated unstable flow or even to a partial region of the separation zone.

Driven, mechanical oscillation systems which move a part of the flowing medium in a direction towards the boundary surfaces 17*a* and 18*a*, such as a loudspeaker, are suitable for use as excitation sources 17, 18 for the compensatory flow field. The boundary surfaces 17*a* and 18*a* then force the flows 15 and 16 extending parallel to them to be emitted out of the outlet apertures between the boundary surfaces 17*a*, 18*a* and the separation points 11 and 12.

This design of the compensatory flow field can be generalized. On the one hand, the flow field must be designed so that it does not represent a flow perpendicular to the unstable layers of the separated unstable flow. It is sufficient for the stabilization of an unstable layer that the compensatory flow field is associated with an adequate component of the pressure gradients perpendicular to the unstable layer. The design of the compensatory flow field in the example of FIG. 2 as a transverse flow is not the only possible solution. The specification of the direction transverse to the flow in this example merely provides a particularly efficient way of influencing the unstable layers which extend, at least in the proximity of the separation points 11 and 12, approximately perpendicular to the flow 10 through the slit 9. A second generalization of the design of the compensatory flow field is, starting from the example of FIG. 2, via the choice of the preferred number of excitation sources required for the production of the compensatory flow field. In the example of FIG. 2, two excitation sources are provided because two unstable layers are present extending downstream starting from the separation points 11 and 12 and because both layers have to be acted on in anti-phase in order to compensate the anti-symmetric global flow oscillations which arise. The situation will be different when a symmetric flow oscillation is to be damped in different feed-back conditions (for example a different form of the obstacle). In this case, the two loudspeakers must be driven in phase. Both for symmetric as well as for anti-symmetric flow oscillations, a single excitation source can be adequate for producing the compensatory oscillation in order to obtain a damping of flow oscillation. The maximum damping achievable is in this case usually lower. Physically, one has in principle more degrees of freedom by a further increase in the number of excitation sources (amplitude or phase) available for optimizing the damping of the flow oscillations.

Figure 3:
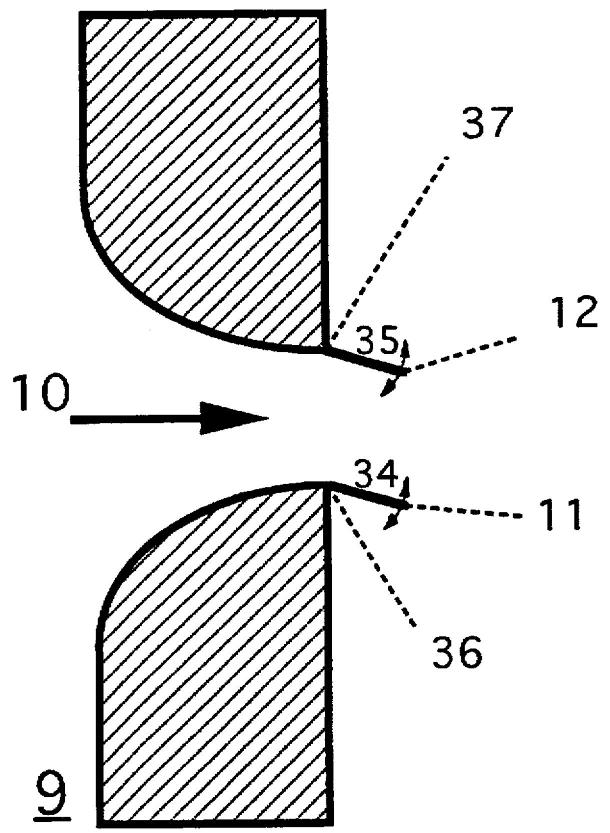
FIG. 3 an arrangement for producing a compensatory oscillation by oscillation of a separation point.
Figure 4A:
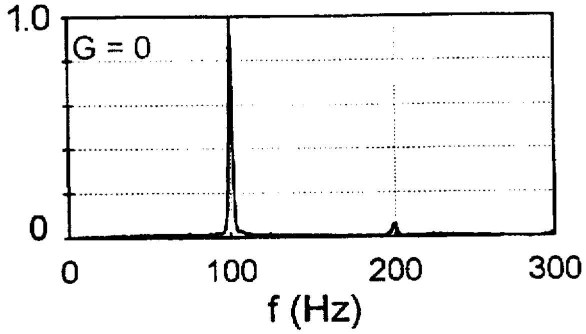
FIGS. 4A–H illustrate frequency spectra of sensor signals for determining the flow oscillations for various compensatory oscillations superimposed in the separation zone.
Figure 4B:
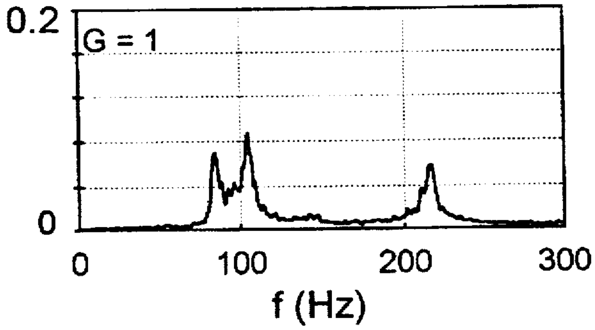
Figure 4C:
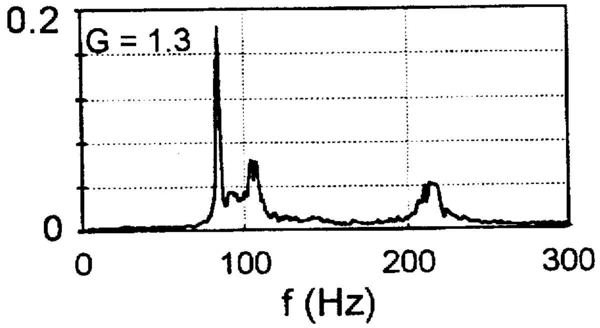
Figure 4D:
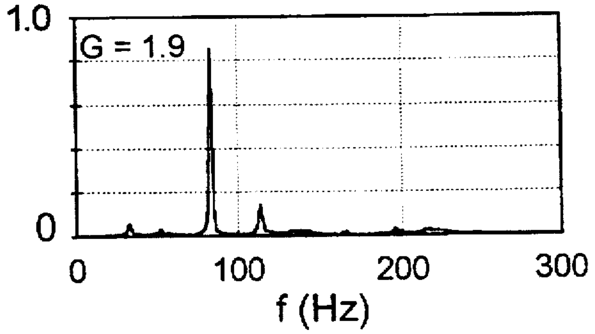
Figure 4E:
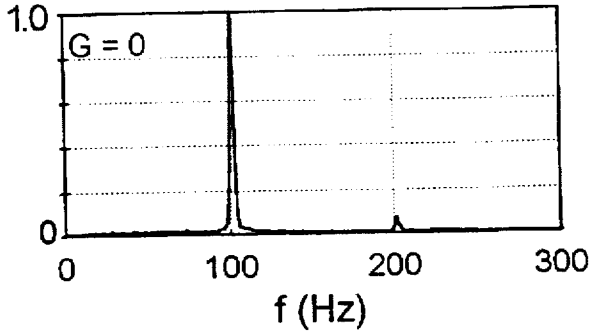
Figure 4F:
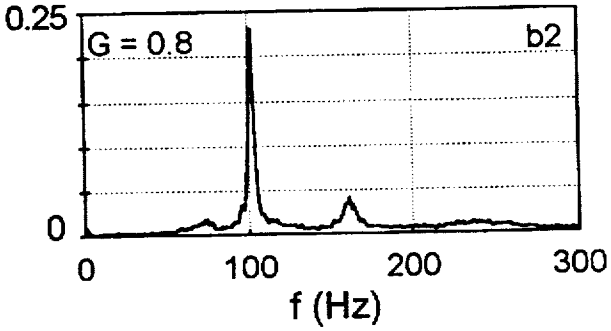
Figure 4G:
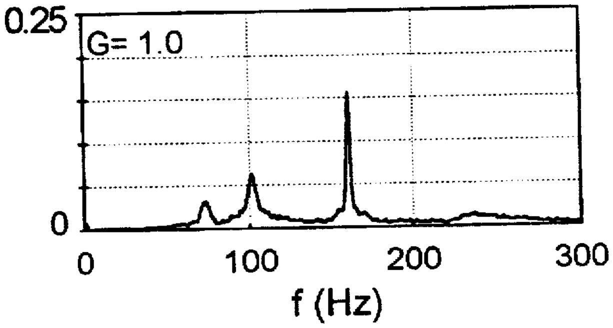
Figure 4H:
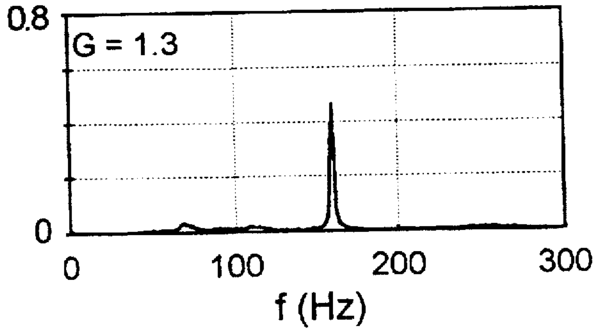

FIG. 3 shows an efficient alternative to this acoustic method of producing a compensatory oscillation. In this example, the stabilization of an unstable layer is produced by oscillating the corresponding separation point. This oscillation can be effected by mechanically moving an element of the boundary surface from which the unstable flow separates. In the example of FIG. 3, the separation points 11 and 12 of the separated unstable flow 10 are located at an end point of the boundary elements 34 and 35 respectively which, in turn, are tiltable about the points 36 and 37 respectively by means of conventional controllable displacement members. This tilting leads to a displacement of the separation points perpendicular to the boundary elements and thus to a lateral deviation of an unstable layer transverse to the flow. This deviation is then to be controlled by means of signals of a sensor system so as to compensate a disturbance of the unstable layer in the proximity of a separation point.

The examples in FIGS. 2 and 3 relate to a two-dimensional flow profile which is invariant with respect to a third orthogonal direction so that unstable layers can always be viewed as planes. Both examples can however be generalized to the three-dimensional case with curved unstable layers. In an extreme case, the individual segments of the curved unstable layers will need to be stabilized independently of one another.

III. Processing the sensor signals and control of the compensatory oscillation

In the following, it is assumed that all the controllable parameters for defining the compensatory oscillation, e.g. the amplitudes and phases of the excitation sources for producing a compensatory flow field or the oscillation of the separation points in relation to amplitude and phase, can be adjusted by means of conventional control systems and, moreover, that all the amplitudes and phases to be adjusted can be controlled by means of signals obtained by processing as described below using the above discussed (I) sensor signals.

The flow system of FIG. 2 serves as the example. The amplitude and phases of the two excitation sources 17 and 18 are controlled by a signal obtained via frequency filtering and/or amplification and/or phase shifting of the signal from the sensor 13. The signals of the sensor 13 are supplied to a frequency filter 25 (24). This frequency filtering is optional and merely serves for suppressing noise. The frequency filter signal is supplied via a line 27 to an amplification element 29 and from there via the line 31 to the excitation source 18. This signal determines amplitude and phase of the excitation source 31. The amplitude and phase of the excitation source 17 is derived correspondingly from the signal of the sensor 13 modified by the frequency filter 25 and the amplification element 28 and supplied via the connection lines 26, 30. It is the function of the amplification elements 28, 29 to, on the one hand, amplify the signal supplied thereto by a factor $G_i$ (which is in general frequency dependent) and to shift the phase by a value $\Phi_i$ where i is the index for the amplification element (this value also being, in general, frequency dependent).

This example can be generalized in an analogous manner to systems with any number of excitation sources or to systems with oscillating separation points. An amplification element such as the element 28, 29 and associated connections for signal transfer is provided for driving each independently controllable element contributing to the compensatory oscillation in the separation zone.

For a complete description of the method of the invention it is sufficient to specify a design rule for selecting suitable amplifications $G_i$ and phases $\Phi_i$ for the individual amplification elements. For the example of FIG. 2, a treatment with two amplification elements is sufficient. Further amplification elements can be set up by using the same design rules.

The system in FIG. 2 shows an anti-symmetric flow oscillation. Since the vortices arising from the two separation points are produced with opposite phase and the same intensity, it is advantageous to apply the same anti-phase amplification to the two amplification elements, i.e. $G=G1=G2$ and $\Phi_1-\Phi_2=\pm\pi$, and to select G and $\Phi_1$ such that the flow oscillation is damped by a prespecified factor.

FIGS. 4A–H show the frequency spectrum of the signal of the sensor 13 for an arrangement in accordance with FIG. 2 when the compensatory oscillation is active for various amplifications G and various frequency filters 25 and with a bandpass filter having maximum transmission at the frequency of the flow oscillation (FIGS. 4A to D) and with a highpass filter (FIGS. 4E to H). In all cases, $\Phi_1$ is selected such that the global flow oscillation present for amplification $G=0$ (in this example at f=100 Hz) is optimally damped for increasing amplification. As the FIGS. 4A to H show, the mode initially present at 100 Hz for both filter types is damped with increasing amplification and disappears for amplification values $G \geqq 1.3$ For larger amplifications a destabilization takes place. The flow oscillation at 100 Hz remains suppressed but flow oscillations arise at other frequencies, the exact value of which depends on the choice of the frequency characteristic of the frequency filter 25. In this case, the flow field produced by the excitation sources 17, 18 only acts in a compensatory portion over a limited spectral region. Outside this spectral region, it can even happen that global flow oscillations are excited above a system-specific threshold for the amplification, these oscillations growing in intensity with the amplification G.

This example is particularly tailored to anti-symmetric flow oscillation. In general, the phases $\Phi_i$ must be selected independently of one another with calibration measurements.

The destabilization shown in FIG. 4 which occurs for larger amplifications is characteristic for amplification elements 29 and 28 in which the phases $\Phi_i$ cannot be adjusted in a controllable manner over the entire frequency range effective for the amplification. In this case, the phases $\Phi_i$ are only adjustable in general such that the feed-back of the signals of the sensor 13 only act in a damping fashion for global flow oscillations on the separated unstable flow within a limited frequency range. Outside this frequency range, the feed-back acts in an amplifying manner on the flow oscillations. These become dominant when the feed-back is strong enough to adequately suppress the flow oscillation present without feed-back of the signal of the sensor 13 in comparison to the amplified flow oscillation. Consequently, using this approach for producing a compensatory feed-back, the global flow oscillation intensity integrated over all frequencies has a minimum for particular values of $G_i > 0$.

The fact that this kind of feed-back only damps global flow oscillations within a frequency band of finite width is limiting for flow systems in which the flow speed V varies. Due to the fact that the frequency of the global flow oscillation changes when the flow speed V changes, the damping of the flow oscillations can only be achieved over a finite range of the flow speeds. If the variations in the flow speed are too large, the feed-back becomes unstable.

The above named instability problems can be remedied by matching the amplification $G_i$ and/or the phases $\Phi_i$ over a wide frequency range. With amplification elements which have frequency responses which can be adjusted in a controlled manner from $G_i$ and/or $\Phi_i$, an optimization of the damping of a flow oscillation can be automated using prespecified criteria. Conventional search strategies, for example starting from $G_i=0$, can be used to select all parameters from $G_i$ and/or $\Phi_i$, (e.g. maximum values, frequency function) for a prespecified frequency range such that the intensity of flow oscillations is minimal or falls below a certain prespecified value. A frequency analyzer for the sensor signals serves to control the optimization. Commercially available amplification elements are suitable for carrying out this optimization. For example, adaptive amplification elements are known in which the amplification and phase are automatically varied over a prespecified frequency range such that a prespecified error signal is minimal. With the signal of the sensor 13 both as the error signal and as the signal to be amplified, an adapter amplification element of this kind can be used for performing an automatic dynamic optimization of the damping of the flow oscillation damping.

Figure 5A:
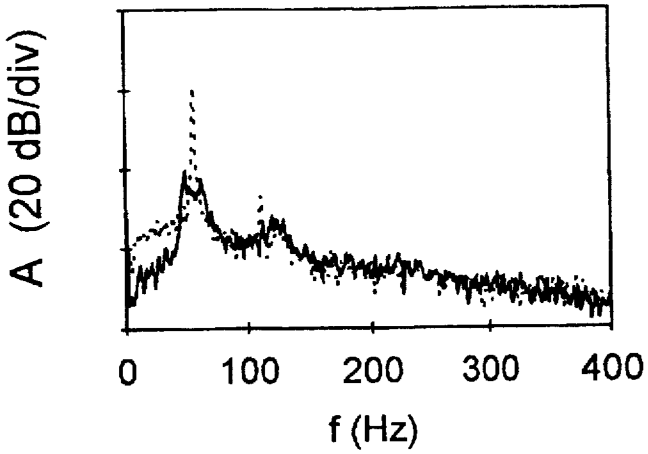
FIGS. 5A–C illustrate frequency spectra of sensor signals for determining the flow oscillations for narrow-band, phase-matched compensatory feed-back.
Figure 5B:
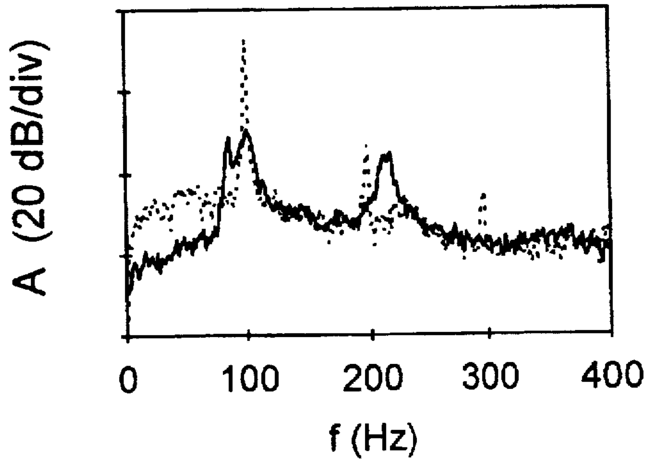
Figure 5C:
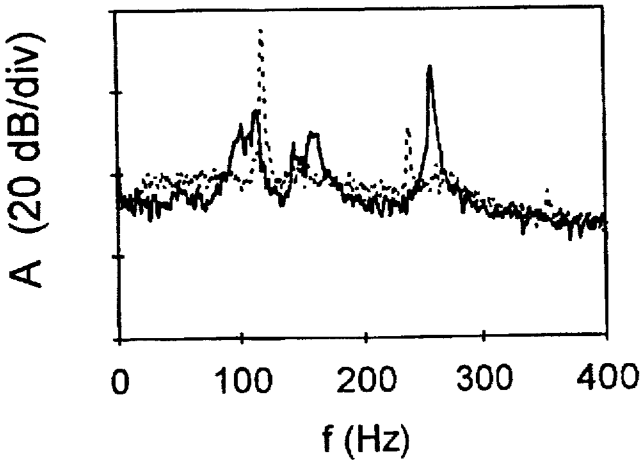
Figure 5D:
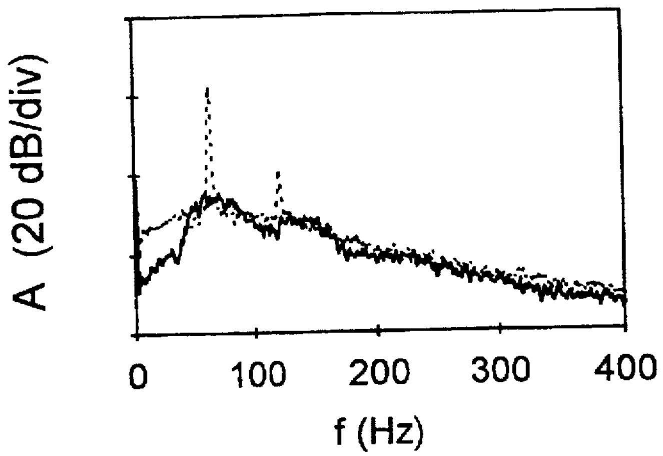
FIGS. 5D–F illustrate frequency spectra of sensor signals for determining the flow oscillations for broad-band, phase-matched compensatory feed-back.
Figure 5E:
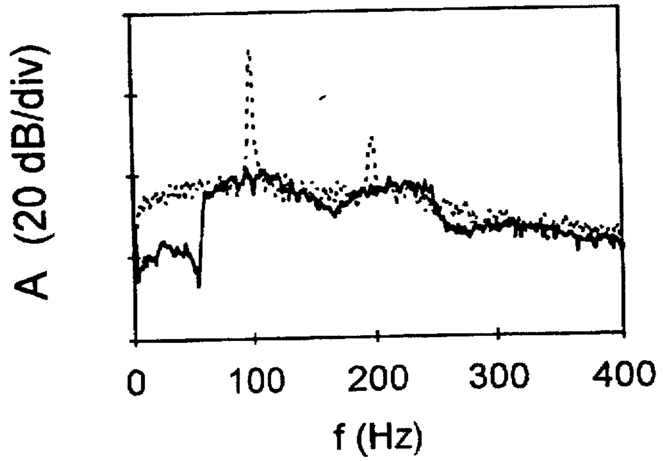
Figure 5F:
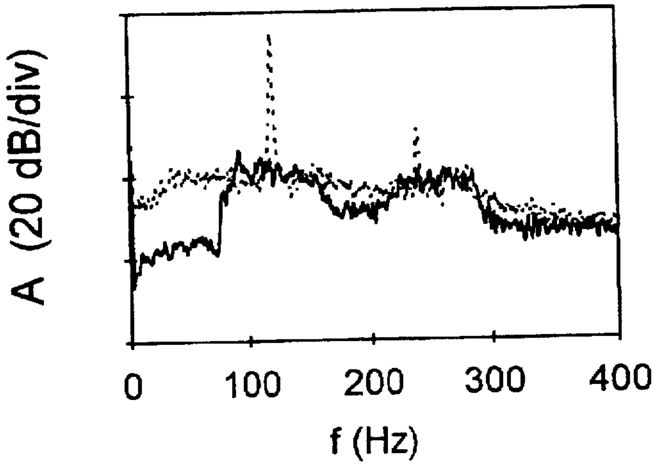

FIGS. 5A to F demonstrate the improvement of the stability of the feed-back loop for producing the compensatory oscillation with the use of adaptive amplification elements in comparison to conventional amplification elements without frequency response matching of the amplification and of phase. FIGS. 5A to 5F show experimental results for an arrangement in accordance with FIG. 2. Frequency spectra of the signals of the sensor 13 (with random zero point) for undamped flow oscillations (dashed lines) and oscillations which are damped under various conditions by compensatory feed-back (solid lines) are compared. Conventional amplification elements 28, 29 were used in the cases of FIGS. 5A to C, whereas in the cases of FIGS. 5D to F amplification elements 28, 29 were used which were adaptive over the frequency range 0–500 Hz. Various figures represent various flow speeds V measured by the Reynold's number $Re=Vh/\nu$ (h: width of the flow as the separation points 11, 12; $\nu$: kinematic viscosity) $\Phi$: 1) $Re=3.9\times10^4$ (FIGS. 5A, D); 2) $Re=6.7\times10^4$ (FIGS. 5B, E); 3) $Re=7.9\times10^4$ (FIGS. 5C, F). The flow oscillations are represented by the maxima peaks over a noisy background, wherein a dominant maximum lies between 50 and 150 Hz depending on the flow speed. Clearly, adaptive amplification elements lead to a broader band damping of the flow oscillations for all flow speeds, whereas, in the case of conventional amplification elements, as a result of the instabilities of the feed-back discussed, flow oscillations are excited in the range above 150 Hz and in the range 50 to 100 Hz in the neighborhood of the flow oscillation which would dominate without feed-back. Apart from the improved stability, the adaptive amplification elements allow a stronger damping of the flow oscillations by more than 30 dB and an additional damping of the low frequency noise for frequencies below the frequencies of the flow oscillations.

Figure 6A:
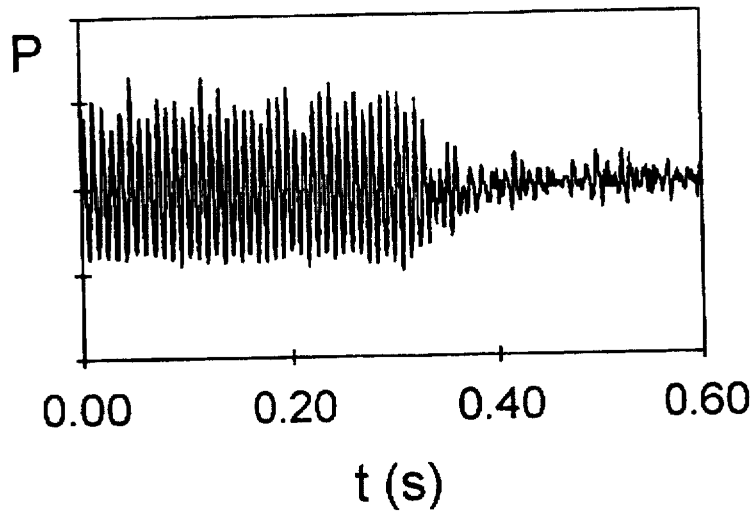
FIGS. 6A–B illustrate sensor signals for determining flow oscillations as a function of the time from when the active damping is switched on and off.
Figure 6B:
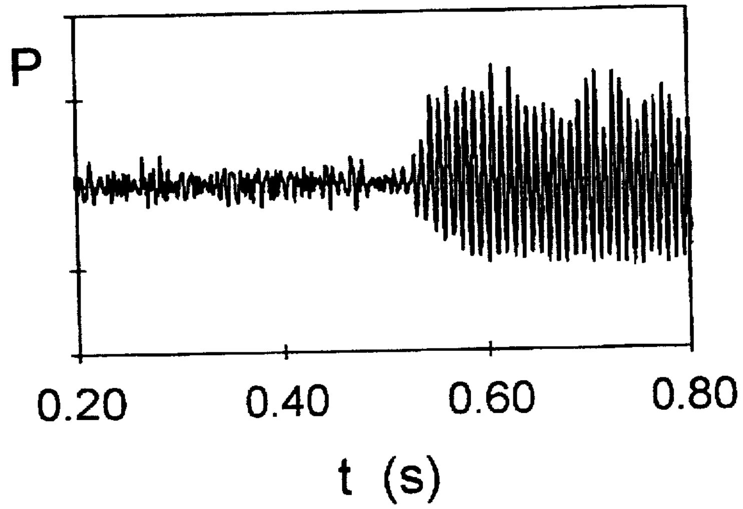

An instructive property for the efficiency of the method of the invention is shown by FIGS. 6A to B which illustrates the evolution of the signals of the sensor 13 (in random units) as a function of time t on switching on (FIG. 6A) and switching off (FIG. 6B) of the damping with the use of adaptive amplification elements. As shown in FIG. 6A, on switching on the damping, a transition occurs from a strong periodic sensor signal corresponding to the intensity of the undamped flow oscillation to a weak noise signal within a few cycles with the frequency of the global flow oscillation. In contrast, on switching off the feed-back of the sensor signals, the strong periodic signal of the undamped flow oscillation returns out of the weak noise signal within a few cycles with the frequency of the flow oscillation (FIG. 6B). Since the compensatory oscillation required for damping the flow oscillation is derived via amplification from the signal of the sensor 13, the power required for damping the flow oscillation is also not constant. This power reduces over several periods of the flow oscillation from a maximum value at the start of damping to a minimum power required for preventing a new self-excitation of a flow oscillation (FIG. 6A). This effect additionally improves the efficiency of the method of the invention due to the above-discussed special feature that, in order to damp a global flow oscillation and its acoustic subsidiary effects, only a minimum part of the separated unstable flow needs to be stabilized under consumption of power.

Figure 7:
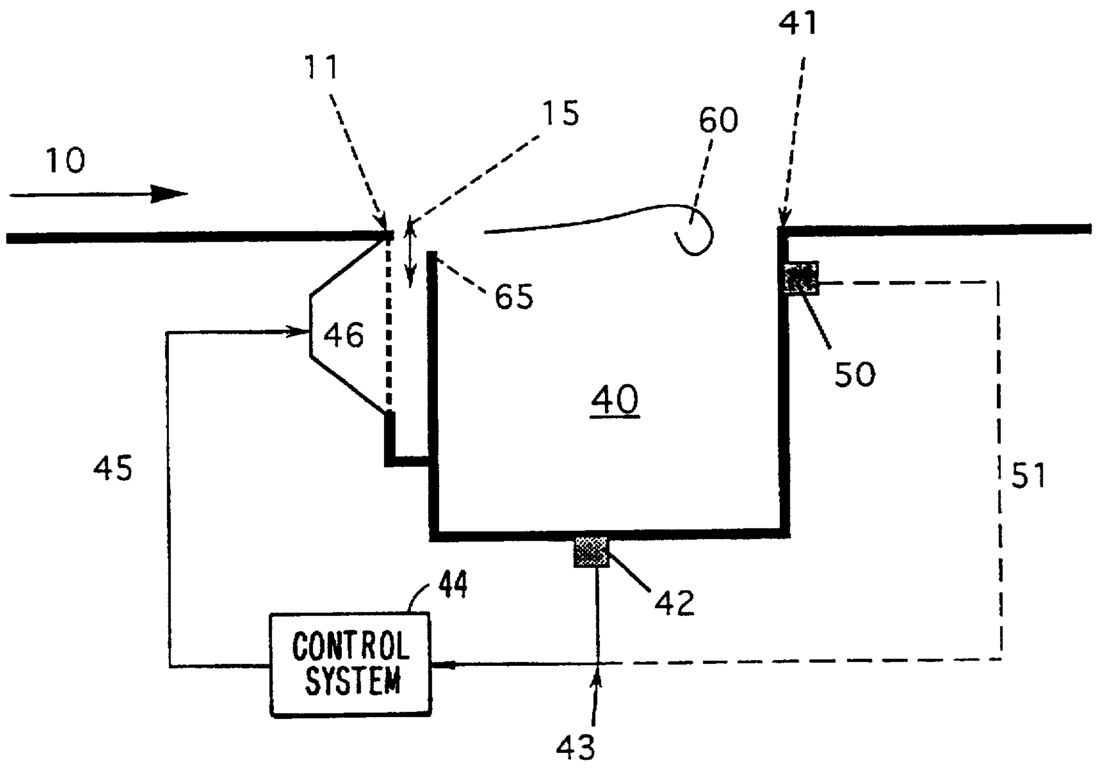
FIG. 7 is an arrangement for active damping of flow oscillations with an acoustic resonator having an aperture facing towards a flow along a boundary surface.

FIG. 7 shows an application of a method of the invention in a system with a separated unstable flow in which global flow oscillations are excited not exclusively by obstacles in the flow but rather with contributions from acoustic resonances which interact with the separated unstable flow. The flow system of FIG. 7 comprises a flow 10 along a boundary surface having an aperture with a forward and a rearward limitation 11 and 41 respectively turned relative to the flow direction. A space 40 borders the boundary surface on the side remote from the flow and is open towards the aperture 11, 41 but is otherwise closed by the boundary surfaces. As a result of the aperture, the space 40 is accessible for the flowing medium. Furthermore, in the region of the opening, the parts of the flowing medium enclosed in the space 40 can interact with the part of the flow medium moving along the boundary surface. As a result of this coupling, the parts of the flow medium bordered by the space 40 can be excited to form acoustic vibrations or oscillations and the space 40 acts as an acoustic resonator for these oscillations. The flow 10 separates off from a boundary surface at the limitation 11. The limitation 11 thus has the function of a separation point with a bordering separation zone for the flow 10 and serves as a starting point for production of vortices of a global flow oscillation 60. In this case, two mechanisms are involved in the selection of the global flow:

- the feed-back action of the flow upstream caused by the interaction of the flow with the limitation 41 (obstacle);
- the interaction of an unstable layer starting from the separation point 11 with an acoustic resonance of the space 40.

The flow system shown in FIG. 7 is a model system which has counterparts in many technical applications. Aeronautical bodies and maritime bodies (e.g. airplanes, rockets, ships, submarines) and land vehicles such as high-speed trains often have recesses in their surface which act as sources for global flow oscillations when rapidly moving. The recesses act as acoustic resonators and thus lead to particularly intense oscillations of the flow. Recesses of this kind are often provided as useful space for accommodation of objects which should under normal conditions not be directly subjected to the flow but when required must be put in contact with the flowing medium, for example sensors and measurement instruments in airplanes or in weapons mounted on military aircraft. Another example are electrically driven high-speed trains. They are usually provided with current takeoffs mounted in sunken recesses which when driving need to be in contact with a power line near the outer surface of the train and thus, at high travelling speeds, are subjected to a comparably strong flow. Objects of this kind can be subjected to unacceptable loads at extreme flow speeds as a result of the flow oscillations or the acoustic resonance of the recess which occurred. For problems of this kind, the application of an active method for damping the flow oscillations is particularly advantageous since passive measures, such as a particular choice of the shape of the recess, are in most cases not sufficient to prevent the flow oscillations.

The model system in FIG. 7 shows how the method of the invention can be advantageously applied in such cases. A compensatory oscillation is superimposed in the separation zone or in a part thereof. In this example, a transverse flow 15 generated by a loudspeaker 46 acting as an excitation source is provided between the separation point 11 and the limitation 65. In order to realize the feed-back required for the active damping of the flow oscillations, the loudspeaker 46 is driven with signals of a sensor 50 or 42 for measuring the flow oscillations, these signals having been suitably frequency filtered and/or amplified and/or phase shifted with the control system 44. In comparison to the examples already discussed, there are alternatives in relation to the sensor. A sensor 50 which senses the speed variations or the pressure pulses of the vortices 60 generated as directly as possible is suitable as a sensor, e.g. one of the above-mentioned sensors mounted in the proximity of the limitation 41. Moreover, a sensor which detects the acoustic waves associated with the flow oscillation 60 is suitable, e.g. a microphone 42 at the side of the space 40 opposite to the opening between the limitations 11 and 41.

It is noted that the acoustic radiation broadcast from the loudspeaker 46 is, for the most part, converted into transverse flow 15 and is not provided for compensating the acoustic oscillation excited by the flow oscillation 60 in the space 40 and thus indirectly to suppress the flow oscillation 60. Moreover, the embodiments of FIG. 7 can be modified corresponding to the various different possibilities for realizing the compensatory oscillation, the measurement of the global flow oscillation, the processing on the sensor signals, and the control of the compensatory oscillation corresponding to the embodiments described in sections I–III.

What is claimed is:

1. A method for damping global flow oscillations in a flowing medium in a region of an unstable flow separating itself from at least one boundary surface, the method comprising:

- placing a sensor system in the flowing medium;
- detecting the global flow oscillations with the sensor system, the sensor system generating signals in response thereto; and
- superimposing a compensatory flow oscillation, controlled via the signals of the sensor system, onto the flowing medium in a separation zone of the unstable flow.

2. The method of claim 1, further comprising measuring the global flow oscillations at a prespecified point in the flowing medium via measurements of at least one of the pressure or the flow speed.

3. The method of claim 1 further comprising generating a flow field as the compensatory flow oscillation in at least one separation zone.

4. The method of claim 3 further comprising exciting an oscillation of at least one separation point of the separated flow.

5. The method of claim 1 further comprising exciting an oscillation of at least one separation point of the separated flow.

6. The method of claim 1 wherein the global flow oscillations are measured by evaluating the signals of the sensor system, and the global flow oscillations are characterized, based on the signals, in regard to at least one of either frequency, intensity, or phase.

7. The method of claim 1 wherein the signals of the sensor system are modified by at least one of either amplification, frequency filtering, or phase shifting.

8. The method of claim 7 wherein the modified signals of the sensor system are used for producing the compensatory oscillation.

9. The method of claim 7 further comprising matching the amplification and the phase shifting with adaptive amplification elements over a prespecified frequency range in accordance with prespecified rules so that the intensity of the global flow oscillations lies below a prespecified value.

10. The method of claim 1 wherein at least one of either the separated unstable flow or the global flow oscillations interact with an acoustic wave.

11. A method for damping global flow oscillations in a flowing medium in a region of an unstable flow separating itself from at least one boundary surface, the method comprising:

- measuring the global flow oscillations, which are caused by influencing the separated unstable flow with an obstacle, by measuring the force that the flow exerts on the obstacle with a sensor system; and superimposing a compensatory flow oscillation controlled via the signals of the sensor system onto the flowing medium in a separation zone of the unstable flow.

12. A method for damping global flow oscillations in a flowing medium in a region of an unstable flow separating itself from at least one boundary surface, wherein at least one of the unstable flow or the global flow oscillations interact with an acoustic wave, the method comprising:

detecting the global flow oscillations with a sensor system, the sensor system generating signals in response thereto;

superimposing a compensatory flow oscillation controlled via the signals of the sensor system onto the flowing medium in a separation zone of the unstable flow; and influencing the acoustic wave with an acoustic resonator.

13. The method of claim 12, further comprising measuring the global flow oscillation with the sensor system.

14. An apparatus for damping global flow oscillations in a flowing medium in a region of an unstable flow separating from at least one boundary surface, the apparatus comprising:

a sensor system placed in the flowing medium for measuring the global flow oscillations, the sensor system generating signals in response thereto;

a control system that evaluates the signals of the sensor system and controls the compensatory oscillation in order to damp the amplitude of the global flow oscillations by a prespecified factor; and a generator which superimposes a compensatory oscillation on the flowing medium in a separation zone of the separated unstable flow.

15. An apparatus for damping global flow oscillations in a flowing medium in a region of an unstable flow separating from at least one boundary surface, the apparatus comprising:

an obstacle in the separated unstable flow that causes the global flow oscillations;

a sensor system for measuring the global flow oscillations, the sensor system producing signals in response thereto;

a control system that evaluates the signals of the sensor system and controls the compensatory oscillation in order to damp the amplitude of the global flow oscillation by a prespecified factor; and a generator which superimposes a compensatory oscillation on the flowing medium in a separation zone of the separated unstable flow.

16. The apparatus of claim 15 wherein the sensor system comprises a force sensor for measuring the force exerted by the flow onto the obstacle.

17. The apparatus of claim 15 wherein the compensatory oscillation is at least one of either:

a flow field, wherein the generator comprises at least one excitation source for producing the flow field; or at least one separation point, wherein mobile boundary elements for the separated flow are provided for exciting the oscillation of the separation points, the boundary elements defining the position of the separation points, wherein the generator comprises an apparatus for producing a movement of the boundary elements, with the movement effecting the oscillation of the separation points.

18. The apparatus of claim 15 wherein the control system comprises at least one of either a frequency filter, a frequency analyzer, an amplifier, or a phase shifter for processing the signals of the sensor system.

19. The apparatus of claim 15 wherein the separated unstable flow occurs at a recess in a boundary surface which is remote from the flowing medium.

* * * * *